(12) United States Patent
Gust et al.

(10) Patent No.: US 9,586,706 B2
(45) Date of Patent: Mar. 7, 2017

(54) APPARATUS AND METHODS FOR LOADING PRODUCT INTO CASES

(75) Inventors: Ronald Matthew Gust, Miltona, MN (US); Anthony Moske, Parkers Prairie, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 13/634,911

(22) PCT Filed: Mar. 25, 2011

(86) PCT No.: PCT/US2011/029894
§ 371 (c)(1),
(2), (4) Date: Sep. 14, 2012

(87) PCT Pub. No.: WO2011/126762
PCT Pub. Date: Oct. 13, 2011

(65) Prior Publication Data
US 2013/0008762 A1    Jan. 10, 2013

Related U.S. Application Data

(60) Provisional application No. 61/318,299, filed on Mar. 27, 2010.

(51) Int. Cl.
*B65G 47/68* (2006.01)
*B65B 5/06* (2006.01)
(Continued)

(52) U.S. Cl.
CPC ............... *B65B 5/061* (2013.01); *B65B 5/08* (2013.01); *B65B 5/106* (2013.01); *B65B 35/24* (2013.01);
(Continued)

(58) Field of Classification Search
CPC ........ B65G 47/31; B65G 47/30; B65G 47/26; B65G 47/56; B65G 47/71; B65G 47/244
(Continued)

(56) References Cited

U.S. PATENT DOCUMENTS 3,512,336 A * 5/1970 Rosecrans ........................ 53/537
3,641,735 A * 2/1972 Daily et al. ..................... 53/537
(Continued)

FOREIGN PATENT DOCUMENTS

| CN | 101161551 A | 4/2008 |
|----|-------------|--------|
| CN | 201362382 Y | 12/2009 |
| DE | 9115374 U1 | 2/1992 |
| EP | 1288126 A2 | 3/2003 |
| FR | 2248216 A1 | 5/1975 |

*Primary Examiner* — James R Bidwell
(74) *Attorney, Agent, or Firm* — Alan D. Kamrath; Kamrath IP Lawfirm, P.A.

(57) ABSTRACT

Product can be conveyed on a divider conveyor (16) in the same orientation or perpendicular to the orientation as when transferred from an input conveyor (12) as well as at different locations in the pack pattern to be cased by moving the divider conveyor (16) perpendicular to the conveying direction and/or by varying the conveying speed of the divider conveyor (16). The divider conveyor (16) transfers product onto an upper containment plate (40) moveable to an inoperative position to transfer product to a lower containment plate (36) moveable to an inoperative position to transfer product to a table (28). Product can be compressed between the table (28) and the upper containment plate (40) and can be pushed by a loader plate (32) into a case when the table (28) is in its lower position.

19 Claims, 2 Drawing Sheets

(51) Int. Cl.
*B65B 5/08* (2006.01)
*B65B 5/10* (2006.01)
*B65B 35/24* (2006.01)
*B65B 35/50* (2006.01)
*B65B 35/56* (2006.01)
*B65G 47/244* (2006.01)
*B65G 57/03* (2006.01)

(52) U.S. Cl.
CPC .............. *B65B 35/50* (2013.01); *B65B 35/56* (2013.01); *B65G 47/244* (2013.01); *B65G 57/035* (2013.01)

(58) Field of Classification Search
USPC ... 198/427, 431, 432, 433, 436; 53/147, 537
See application file for complete search history.

(56) References Cited

U.S. PATENT DOCUMENTS

| | | | | |
|---|---|---|---|---|
| 3,996,723 | A * | 12/1976 | Greenwell | 53/500 |
| 4,279,557 | A * | 7/1981 | Stodt et al. | 198/436 |
| 4,684,008 | A * | 8/1987 | Hayashi et al. | 198/436 |
| 4,999,578 | A * | 3/1991 | Ohashi et al. | 198/346.2 |
| 5,022,218 | A * | 6/1991 | Prakken | 53/529 |
| 5,209,339 | A | 5/1993 | Antonissen | |
| 7,275,635 | B2 * | 10/2007 | Enya | 198/463.3 |
| 7,404,478 | B2 | 7/2008 | Weber | |
| 7,717,251 | B2 | 5/2010 | Glas | |
| 9,126,769 | B2 | 9/2015 | Bauer | |
| 2004/0069156 | A1 * | 4/2004 | Reed et al. | 198/431 |
| 2006/0070353 | A1 * | 4/2006 | Van Dam | 53/447 |

* cited by examiner

APPARATUS AND METHODS FOR LOADING PRODUCT INTO CASES

BACKGROUND

Apparatus and methods for loading product into cases are shown and described.

Many types of product are packaged in bags for retail sale but which are placed in cases for transport and storage. Further, such bags are of different sizes and/or are desired to be in different pack patterns inside of cases. Thus, there is a continuing need for apparatus and methods for loading product into cases which have reduced cost with improved reliability, which is able to quickly and easily be adjusted corresponding to the desired bag size and/or desired pack pattern, and which have a reduced overall size and a reduced footprint.

SUMMARY

This need and other problems in the field of case loading is solved by providing a divider conveyor intermediate and independently driven from an input conveyor and a loading conveyor and which is movable in directions perpendicular to the conveying direction to rotate product while being conveyed and/or to align the product with a predetermined position in a collated row. Thus, by varying the speed and/or by moving the divider conveyor, the product can be conveyed on the divider conveyor in the same orientation or in orientations perpendicular to the product orientation on the input conveyor and/or at different locations in the pack pattern to be cased.

In a further aspect, product can be conveyed onto a side wall at an acute angle to a loading table, with the side wall being moveable to a position generally perpendicular to the table to stand product on the table in the pack pattern to be cased.

In further aspects, product is transferred from an upper containment plate onto a lower containment plate each moveable between containment positions and inoperative positions and onto a table of a lowerator. Product can be sandwiched between the upper containment plate and the table and between loading walls of the lowerator. Product can be pushed from the table in its lower position into a case after divider doors are opened.

Illustrative embodiments will become clearer in light of the following detailed description in connection with the drawings.

DESCRIPTION OF DRAWINGS

The illustrative embodiments may best be described by reference to the accompanying drawings where.

Figure 1:
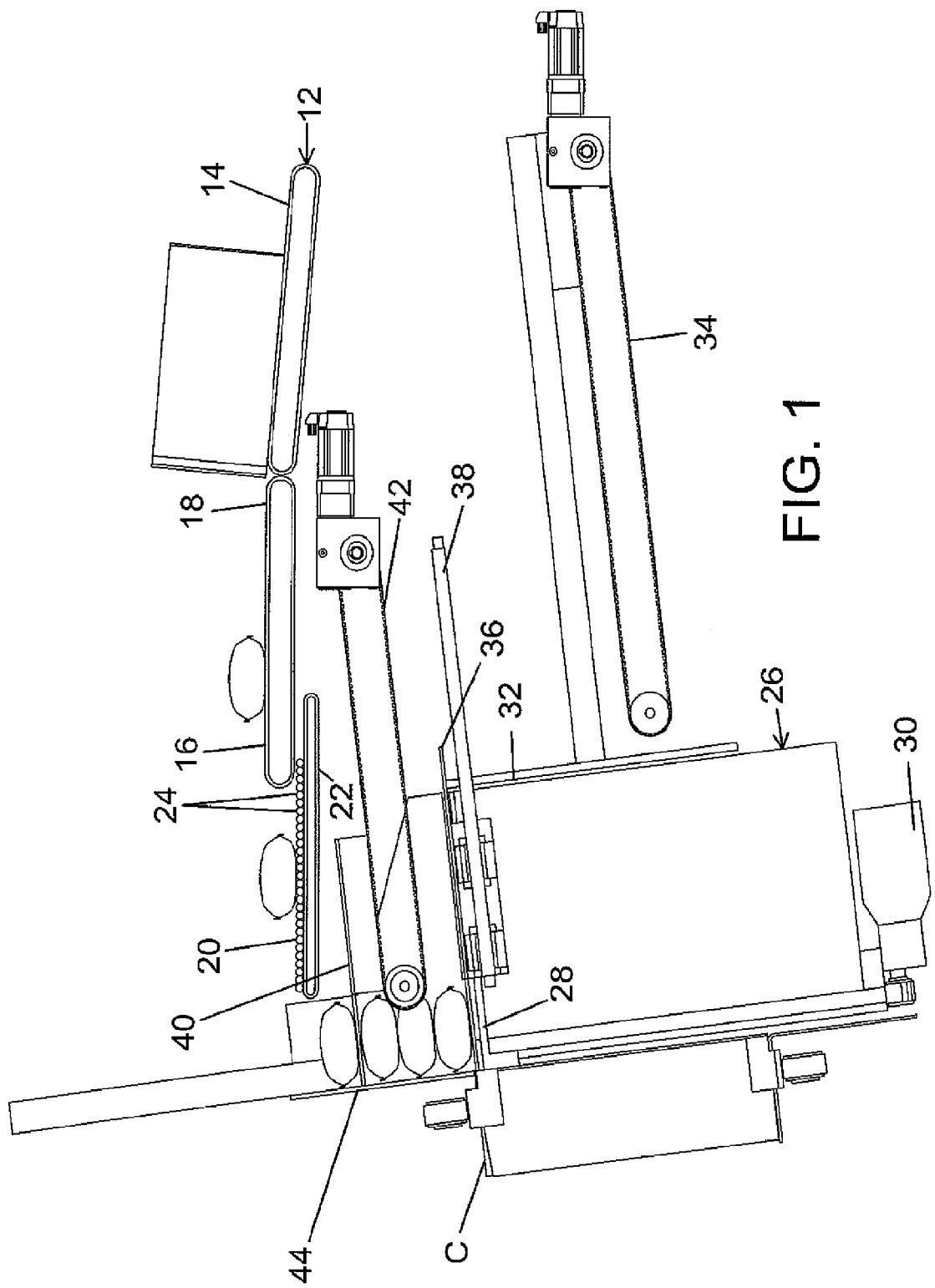
FIG. 1 shows a diagrammatic side view of an apparatus for loading product into cases.
Figure 2:
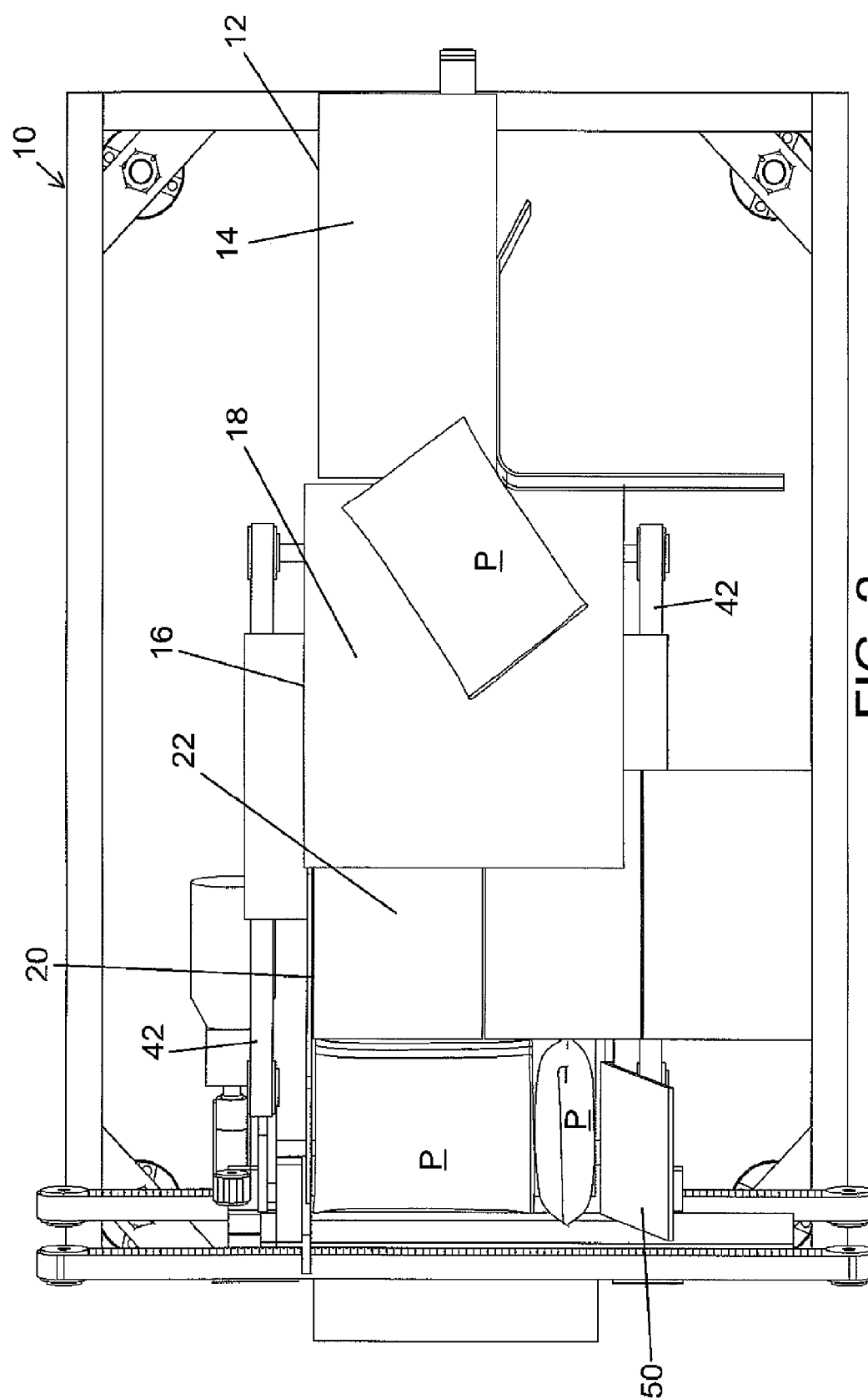
FIG. 2 shows a diagrammatic top view of the apparatus of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

An apparatus for loading product such as in the form of bags into a case utilizing methods is shown in the drawings and generally designed 10. Generally, apparatus 10 includes an input conveyor 12 supplying multiple product P by conveying in a conveying direction and in a random spacing but at a constant speed, with product P in the form shown of bags being conveyed with fin seals leading and trailing at its first and second ends and with first and second sides extending between the first and second ends. In the form shown, input conveyor 12 includes an endless conveyor belt 14 moving in the conveying direction.

Apparatus 10 further includes a divider conveyor 16 conveying product P in the conveying direction. In the form shown, divider conveyor 16 includes an endless conveyor belt 18 moving in the conveying direction. The width of divider conveyor 16 and conveyor belt 18 is multiple times the width of input conveyor 12 and conveyor belt 14 in a direction perpendicular to the conveying direction. Further, conveyor belt 18 is driven independently of conveyor belt 14 and at variable speeds. Product P is transferred from conveyor belt 14 onto conveyor belt 18. Divider conveyor 16 is moveable in a direction perpendicular to the conveying direction relative to conveyor 12. A suitable mechanism can be provided for mounting divider conveyor 16 for movement in the direction perpendicular to the conveying direction and for moving the divider conveyor 16 according to the desired operation. Thus, the location at which product is transferred to conveyor belt 18 from conveyor belt 14 will be dependent upon the location of divider conveyor 16 relative to input conveyor 12.

Apparatus 10 further includes a loading conveyor 20 conveying product P in the conveying direction. In the form shown, loading conveyor 20 includes a plurality of rollers 24 supported upon an endless conveyor belt 22. In the form shown, the upper run of conveyor belt 22 moves opposite to the conveying direction so that rollers 24 rotate for moving product P in the conveying direction. The width of loading conveyor 20 perpendicular to the conveying direction is at least equal to the width of the case C into which product P is desired to be loaded. Further, loading conveyor 20 is driven independently of conveyors 12 and 14. Product P is conveyed from divider conveyor 16 onto loading conveyor 20. Although shown of the type including endless conveyor belt 22 rotating rollers 24, loading conveyor 20 can be of other forms including, but not limited to, an endless conveyor belt without rollers 24 or an air table in the form of a static plate with longitudinal grooves into which air is directed in a pulsed manner so that air streams along the concave sections of the grooves deliver product P while minimizing energy consumption.

Apparatus 10 further includes a lowerator 26 including a table 28 having a width perpendicular to the conveying direction at least equal to the width of case C and a length in the conveying direction at least equal to the height of case C. Table 28 is moveable between an upper or home position and a lower position in a generally vertical direction and substantially perpendicular to the conveying direction. A suitable mechanism can be provided for moving table 28 according to the desired operation including, but not limited to, a servo motor 30. As is conventional, table 28 is at a small acute angle to the horizontal to utilize gravity when transferring product P therefrom. Lowerator 26 further includes a loader plate 32 moveable parallel to the table 28 in the lower position. A suitable mechanism can be provided for moving loader plate 32 including, but not limited to, being mounted to an endless drive mechanism 34 shown.

Apparatus 10 further includes a lower containment plate 36 moveable generally in the conveying direction between a containment position and an inoperative position. In the containment position, containment plate 36 is generally parallel to and slightly spaced above table 28 in its upper position. A suitable mechanism 38 can be provided for moving containment plate 36 including, but not limited to, being mounted to a telescopic drive mechanism shown.

Apparatus 10 further includes an upper containment plate 40 moveable generally in the conveying direction between a containment position and an inoperative position. In the containment position, containment plate 40 is generally parallel to and spaced above table 28 in its lower and upper positions and lower containment plate 36 in its containment position. A suitable mechanism can be provided for moving containment plate 40 including, but not limited to, being mounted to an endless drive mechanism 42 shown. The distance between loading conveyor 20 and a backwall 44 of the loading mechanism including lowerator 26 and plates 36 and 44 is at least equal to the height of the case C into which product P is desired to be loaded. It should be appreciated that the distance between loading conveyor 20 and backwall 44 can be adjustable such as by manually or through the use of a power source.

Now that the basic construction of apparatus 10 shown has been set forth, a method of operation can be explained, and some of the advantages can be highlighted. For purposes of explanation, it will be assumed that table 28 is in its upper position, that containment plates 36 and 40 are in their inoperative positions and that no product is located on containment plate 40. In one method of operation, it will be desired to have product P stand upon on the fin seal in case C in a single or multi layer pack pattern. In particular, product P is conveyed from conveyor 12 onto conveyor 16. After being located on conveyor 16 and before being conveyed onto conveyor 20, conveyor 16 is moved perpendicular to the conveying direction until the path of product P is aligned with a predetermined position of a collated row. It should be appreciated that the speed of conveying belt 18 can be adjusted to insure movement of conveyor 16 to the aligned position occurs before product P reaches conveyor 20. After conveyor 16 is at the aligned position, product P is transferred from conveyor 16 onto conveyor 20 and then transferred from conveyor 20 onto containment plate 40.

This process is repeated with the next product P (but with conveyor 16 being moved to a different position so the product P is aligned with a different predetermined position of the collated row) being conveyed on conveyor 12. This process is repeated with each successive product P being conveyed on conveyor 12 until each of the positions of a collated row has been filled. It should be appreciated that more than one product P can be located upon conveyor 16 at one time. As an example, after conveyor 16 is located at the aligned position and while a first product P is being conveyed from conveyor 16 onto conveyor 20, the next product P could be simultaneously conveyed from conveyor 12 onto conveyor 16.

After a row of collated product P has been transferred from conveyor 20 onto upper containment plate 40, containment plate 40 is moved from its containment position to its inoperative position. In so moving, the row of collated product P supported upon containment plate 40 will fall onto and be transferred to and supported upon lower containment plate 36. The product transfer process is repeated with the next product P being transferred from conveyor 20 onto the previous collated row of product supported upon containment plate 36. Generally, the thickness of product determines the number of rows of product P that can be accumulated upon lower containment plate 36. After the desired number of rows of collated product P are supported upon containment plate 36, which will become a layer in case C, containment plate 40 is moved from its inoperative position to its containment position. Then, containment plate 36 is moved from its containment position to its inoperative position. In so moving, the rows of collated product supported upon containment plate 36 will fall onto and be transferred to and supported upon table 28.

Once a layer of product P is supported upon table 28, table 28 is moved up away from its lower position towards its upper position sufficiently to compress the length of the layer of product P between containment plate 40 and table 28. After compression, table 28 is moved to the lower position, allowing loading walls to compress the width of the layer of product P generally perpendicular to the conveying direction. In the lower position, the layer of product P will be positioned directly in front of loader plate 32 and behind divider doors extending over case C. After the divider doors are opened, loader plate 32 can be moved from its loading position to its unloading position to push the layer of product P into case C.

After the layer of product has been pushed into case C, loader plate 32 can be moved to its retracted position, the divider doors are closed, table 28 is moved to its upper position, and containment plate 36 is moved from its inoperative position to its containment position.

It should be appreciated that while containment plate 40 is in its containment position, product P in collated rows will be transferred from loading conveyor 20 onto containment plate 40 such that product P can be continuously conveyed by conveyors 12, 16 and 20 while product P is being unloaded from table 28 by movement of loader plate 32. Thus, when containment plate 40 is moved from its containment position to its inoperative position, product P supported upon containment plate 40 will be transferred from containment plate 40 onto containment plate 36 in its containment position. Operation will continue in a similar manner.

In another method of operation, it will be desired to have product P stand upon a side of the bag in case C with the fin seal perpendicular to the top and bottom of case C. In particular, product P is conveyed from conveyor 12 onto conveyor 16. As product P approaches conveyor 16, the speed of conveyor belt 18 is slowed down relative to the speed of conveyor belt 14, which in the form shown is accomplished by slowing down the speed and/or reversing the conveying direction of conveyor belt 18 as the speed of conveyor belt 14 is constant. Simultaneously, conveyor 16 is moved perpendicular to the conveying direction, which can be either to the right or left of conveyor 12. Thus, due to the slower conveying speed of conveyor belt 18 and the movement of conveyor 16, product P will make a complete 90 degree turn relative to the conveying direction so that the first side is before the second side in the conveying direction. After product P is turned, the speed of conveyor belt 18 is increased, and conveyor 16 is moved perpendicular to the conveying direction until the path of product P is aligned with a predetermined position of a collated row. After alignment, product is conveyed from conveyor 16 onto conveyor 20 and then transferred to containment plate 40 or 36.

Product P can be placed on table 28 with a combination of methods such as with one layer created by turning product P and another layer created by not turning product. Product P which is not turned is moved to a side wall 50 of lowerator 26 which is initially at an acute angle to the vertical and to the table 28. After product P has been transferred from conveyor 20, side wall 50 is raised towards a vertical position generally perpendicular to table 28, and product P will stand up. This operation produces a pack pattern which can be referred to as a side pack plus, as an example.

After a collated row of product P is located on containment plate 36, product P can be transferred from conveyor 20 as an unfinished row which is allowed to scatter across the top as case C is rotated from its loading station. This operation produces a pack pattern which can be referred to as a loose pack, as an example.

Thus, apparatus 10 as shown provides a conveying direction of product which is in line with case C, one of the reasons of a reduced overall size and a reduced footprint. Apparatus 10 according to the form shown requires fewer adjustments and fewer stored motions for different sized product. Further, apparatus 10 includes fewer moving parts in the embodiment shown to reduce cost and improve reliability as well as result in increase productivity.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Method comprising:
supplying multiple product each having first and second ends and first and second sides extending between the first and second ends;
transferring a first product with the first end being before the second end in a conveying direction and on to a divider conveyor;
conveying the first product on the divider conveyor in the conveying direction;
transferring a second product with the first end being before the second end in the conveying direction on to the divider conveyor;
conveying the second product on the divider conveyor; and
moving the divider conveyor perpendicular to the conveying direction while the second product is being conveyed on the divider conveyor, wherein moving the divider conveyor includes moving the divider conveyor while the second product is being transferred on to the divider conveyor with the first side being before the second side in the conveying direction when the second product is conveyed on the divider conveyor.

2. The method of claim 1 wherein moving the divider conveyor comprises moving the divider conveyor after the second product is on the divider conveyor with the first end being before the second end in the conveying direction.

3. The method of claim 1 wherein transferring the second product includes conveying the second product at a first conveying speed; and wherein conveying the second product comprises conveying the second product at a conveying speed less than the first conveying speed while the second product is being transferred on to the divider conveyor.

4. The method of claim 1 wherein transferring the first and second products is at an equal, constant speed.

5. Method comprising:
supplying multiple product each having first and second ends and first and second sides extending between the first and second ends on an input conveyor;
transferring a first product with the first end being before the second end in a conveying direction from the input conveyor and on to a divider conveyor;
conveying the first product on the divider conveyor in the conveying direction; and
moving the divider conveyor perpendicular to the conveying direction while the first product is on both the input conveyor and the divider conveyor.

6. The method of claim 5 wherein transferring the first product includes conveying the first product at a first conveying speed; and wherein conveying the first product comprises conveying the first product at a conveying speed less than the first conveying speed while the first product is being transferred on to the divider conveyor.

7. Method comprising:
supplying multiple product each having first and second ends and first and second sides extending between the first and second ends;
transferring a first product with the first end being before the second end in a conveying direction and on to a divider conveyor;
conveying the first product on the divider conveyor in the conveying direction; and
moving the divider conveyor perpendicular to the conveying direction while the first product is being conveyed on the divider conveyor, wherein moving the divider conveyor includes moving the divider conveyor while the first product is being transferred on to the divider conveyor with the first side being before the second side in the conveying direction when the first product is conveyed on the divider conveyor.

8. Method comprising:
supplying multiple product each having first and second ends and first and second sides extending between the first and second ends;
transferring a first product with the first end being before the second end in a conveying direction and on to a divider conveyor;
conveying the first product on the divider conveyor in the conveying direction;
moving the divider conveyor perpendicular to the conveying direction while the first product is being conveyed on the divider conveyor;
transferring product from the divider conveyor onto a table;
moving the table from a home position to a lower position;
pushing product from the table while the table is in the lower position into a case; and
returning the table to the home position after pushing the product.

9. The method of claim 8 wherein transferring product from the divider conveyor comprises:
transferring product from the divider conveyor onto an upper containment plate in a containment position;
moving the upper containment plate from the containment position to an inoperative position causing product to fall from the upper containment plate; and
returning the upper containment plate from the inoperative position to the containment position after product falls from the upper containment plate; and
wherein moving the table comprises moving the table from the home position away from the lower position to compress product between the upper containment plate and the table after the upper containment plate is returned to the containment position and then moving the table to the lower position.

10. The method of claim 9 wherein moving the upper containment plate comprises:
causing product to fall from the upper containment plate onto a lower containment plate in a containment position;
moving the lower containment plate from the containment position to an inoperative position causing product to fall from the lower containment plate onto the table; and
returning the lower containment plate from the inoperative position to the containment position after product falls from the lower containment plate.

11. The method of claim 10 wherein moving the upper containment plate comprises actuating an endless drive mechanism to which the upper containment plate is mounted; and wherein moving the lower containment plate comprises actuating a telescopic drive mechanism to which the lower containment plate is mounted.

12. The method of claim 8 wherein transferring product from the divider conveyor comprises:
transferring product from the divider conveyor onto a loading conveyor; and
transferring product from the loading conveyor onto a side wall at an acute angle to the table; and
moving the side wall from the acute angle to generally perpendicular to the table to stand product on the side wall relative to the table.

13. The method of claim 8 further comprising: moving loading walls to compress product after the table is moved to the lower position and before pushing product.

14. The method of claim 8 wherein pushing product comprises opening divider doors after the table moves to the lower position; and moving a loader plate parallel to the table in the lower position, with moving the loader plate including actuating an endless drive mechanism to which the loader plate is mounted.

15. Apparatus comprising, in combination: an input conveyor conveying product in a conveying direction with a first end being before a second end in the conveying direction; a divider conveyor receiving product from the input conveyor, with the divider conveyor being driven independently of the input conveyor, and with the divider conveyor being movable relative to the input conveyor generally perpendicular to the conveying direction; a table moveable between a home position and a lower position; and a loader plate moveable parallel to the table in the lower position and between a loading position and an unloading position.

16. The apparatus of claim 15 further comprising, in combination: an upper containment plate moveable between a containment position and an inoperative position, with the table moveable from the home position away from the lower position when the upper containment plate is in the containment position.

17. The apparatus of claim 16 further comprising, in combination: a lower containment plate moveable between a containment position and an inoperative position, with the lower containment plate being intermediate the table and the upper containment plate.

18. The apparatus of claim 17 further comprising, in combination: a first endless drive mechanism, with the loader plate mounted to the first endless drive mechanism; a second endless drive mechanism, with the upper containment plate mounted to the second endless drive mechanism; and a telescopic drive mechanism, with the lower containment plate mounted to the telescopic drive mechanism.

19. The apparatus of claim 15 further comprising, in combination: a loading conveyor, with the loading conveyor receiving product from the divider conveyor; a side wall moveable between an acute angle relative to the table and generally perpendicular to the table, with the side wall receiving product from the loading conveyor when at the acute angle.

* * * * *